(12) United States Patent
Kotian et al.

(10) Patent No.: US 10,346,080 B2
(45) Date of Patent: Jul. 9, 2019

(54) PARTIAL SETUP OF TELEVISION RECEIVER STORAGE DEVICE

(71) Applicant: Sling Media Pvt. Ltd., Bangalore (IN)

(72) Inventors: Preetham Kotian, Bangalore (IN); Jeevan Bhooi, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 15/649,418

(22) Filed: Jul. 13, 2017

(65) Prior Publication Data

US 2019/0018607 A1 Jan. 17, 2019

(51) Int. Cl.
| | |
|---|---|
| G06F 3/06 | (2006.01) |
| G11B 31/00 | (2006.01) |
| H04N 5/775 | (2006.01) |
| H04N 21/44 | (2011.01) |
| H04N 21/4147 | (2011.01) |
| H04N 21/4335 | (2011.01) |
| G11B 27/19 | (2006.01) |
| H04N 21/418 | (2011.01) |

(52) U.S. Cl.
CPC .......... *G06F 3/0644* (2013.01); *G06F 3/0604* (2013.01); *G06F 3/0673* (2013.01); *G11B 27/19* (2013.01); *G11B 31/006* (2013.01); *H04N 5/775* (2013.01); *H04N 21/4147* (2013.01); *H04N 21/4184* (2013.01); *H04N 21/4335* (2013.01); *H04N 21/44004* (2013.01)

(58) Field of Classification Search
USPC .................................................. 386/291–299
See application file for complete search history.

(56) References Cited

U.S. PATENT DOCUMENTS

| | | | |
|---|---|---|---|
| 7,814,307 B2 | 10/2010 | Powell et al. | |
| 2008/0028434 A1* | 1/2008 | Drazin | H04N 5/44543 725/134 |
| 2014/0108587 A1* | 4/2014 | Goldberg | G06F 15/167 709/215 |

* cited by examiner

*Primary Examiner* — Hung Q Dang
(74) *Attorney, Agent, or Firm* — Seed Intellectual Property Law Group LLP

(57) ABSTRACT

Embodiments are directed towards providing fast setup of a storage device communicatively coupled to a television receiver. During initial setup of the storage device, an initial portion of the storage device is partitioned to provide accessibility for the television receiver to store content. However, the initial partition is only a subset of the maximum storage capacity of the storage device, which results in a second remainder portion of the storage device that is inaccessible for the television receiver to store audiovisual content. In response to a triggering event, the television receiver initiates a full partition process to partition the remainder of the storage device that was previously inaccessible for storing content. Once partitioned, the television receiver can then utilize the remainder portion of the storage device for storing long-term recorded content. The television receiver also converts the initial partition into a buffer that is used to temporarily store content.

18 Claims, 12 Drawing Sheets

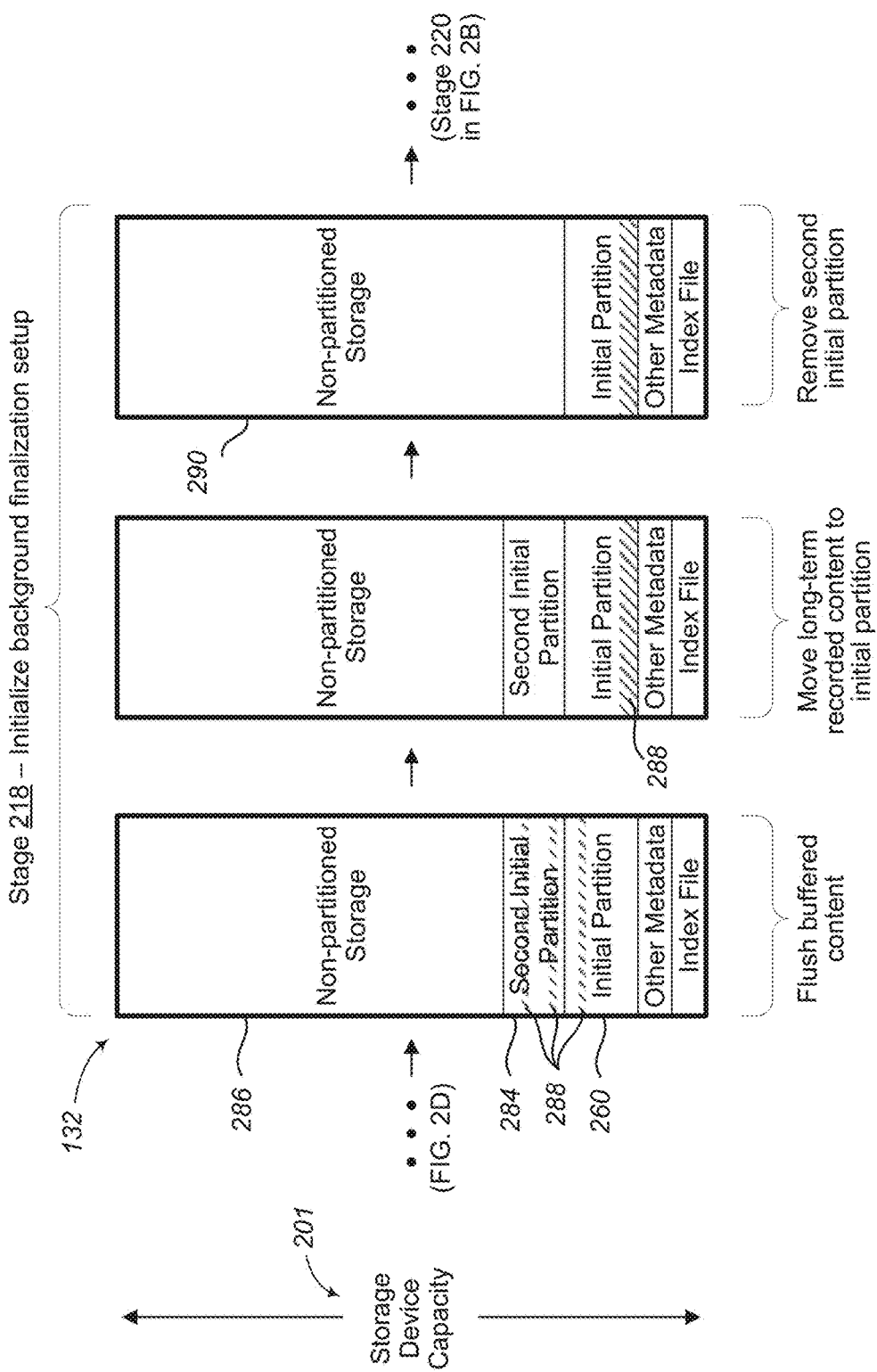

PARTIAL SETUP OF TELEVISION RECEIVER STORAGE DEVICE

BACKGROUND

Technical Field

The present disclosure relates generally to television content receivers, and more particularly, but not exclusively, to setup and initialization of storage devices of a television content receiver.

Description of the Related Art

Television content is often transmitted, if not required to be transmitted, in a digital format. As a result, many users have dedicated television receivers, e.g., set-top boxes, to convert the digital television into a form that can be displayed on a television or other display device. These television receivers also perform a variety of other functions. For example, some television receivers include a digital video recorder for storing television program content. Although most of these types of television receivers include an internal storage device for storing program content, some television receivers utilize external storage devices to store program content or to expand the amount of available storage. When an external storage device is connected to a television receiver for the first time, the television receiver has to perform various actions to pair with the storage device. During this pairing process, many of the other functions of the television receiver, such as watching program content, is unavailable until the pairing is complete. However, depending on the size of the storage device, the file format utilized by the television receiver, and other factors, the pairing time can be quite extensive, which can impact the user's ability to use the television receiver and the storage device for some time. It is with respect to these and other considerations that the embodiments described herein have been made.

BRIEF SUMMARY

Briefly described, embodiments are directed toward systems and methods of providing fast setup of a storage device in communication with a television receiver. Upon initial setup of the storage device, only an initial portion of the storage device is partitioned to provide accessibility for the television receiver to store audiovisual content. However, the initial partition is only a subset of the maximum storage capacity of the storage device. This results in a second remainder portion of the storage device that is inaccessible for the television receiver to store audiovisual content. In this way, only a portion, but not all, of the storage device is partitioned to be used by the television receiver. This will reduce the amount of time it takes the television receiver to initially setup the storage device. The partitioning of only the first portion is completed within a first time interval, which is a relatively short time interval. For example, this first time interval might be on the order of 30 seconds or less.

As a result, the user can begin utilizing the television receiver for other tasks, such as viewing content, sooner than if they had to wait for the entire storage device to be partitioned.

At some point, the television receiver initiates a full partition process to partition the remainder of the storage device that was previously inaccessible for storing content. Once partitioned, the television receiver can then utilize the remainder portion of the storage device for storing long-term recorded content. The partitioning of second portion is completed within a second time interval, which is a longer than the first time interval. For example, this second time interval might be on the order of tens of minutes or more.

After the partitioning of the remainder of the storage device, the initial partition can be used to temporarily store content like space for buffering live content, or for recorded content. By converting the initial partition into the storage buffer, the television receiver does not have to perform additional actions in creating additional partitions for temporarily storing content.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 2E-2F show an illustrated example of yet additional or alternative stages utilized by the television receiver to set up the storage device, in accordance with embodiments described herein;

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
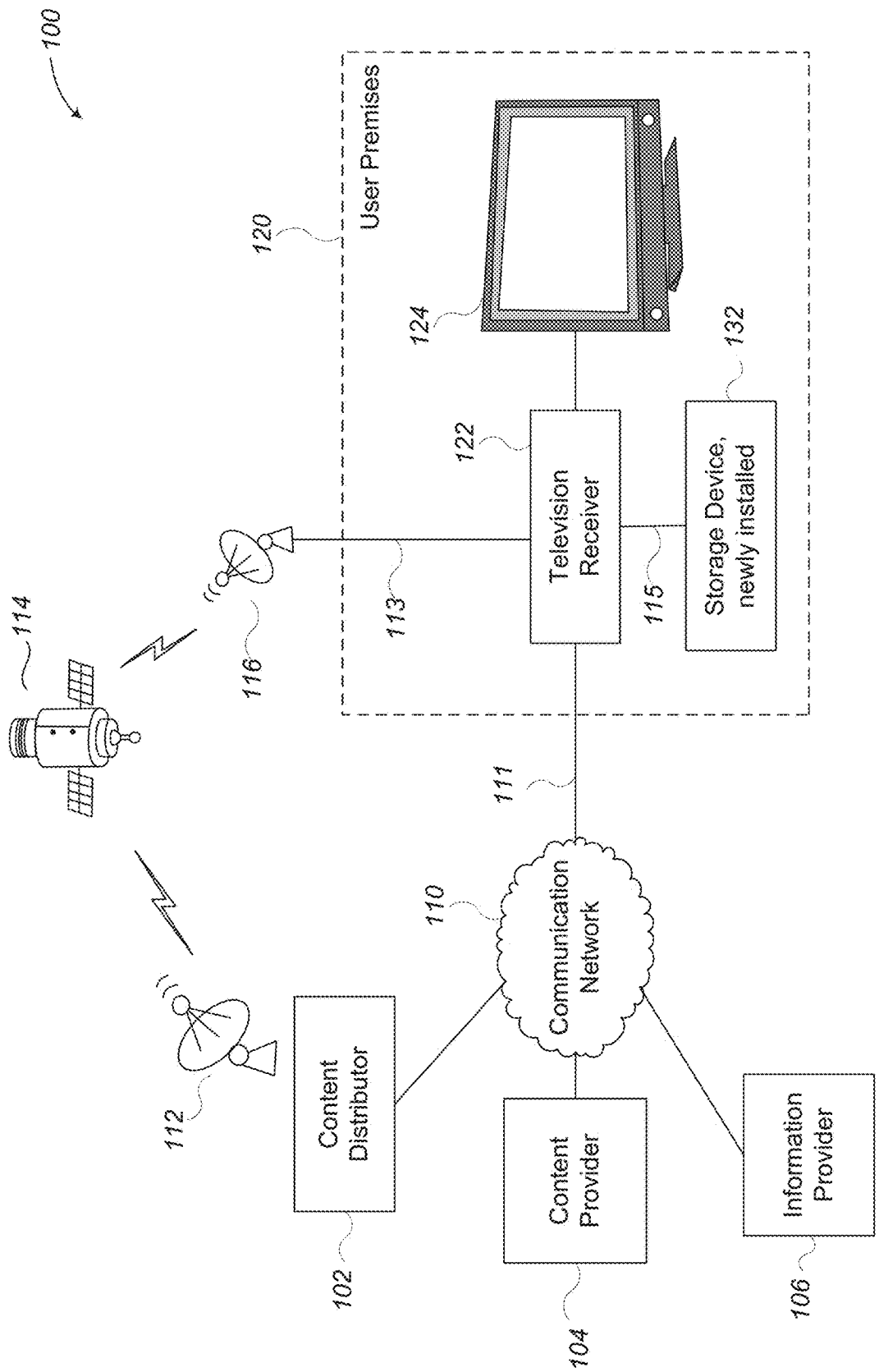
FIG. 1 illustrates a context diagram for providing audiovisual content to a user.

FIG. 1 illustrates a context diagram for providing audiovisual content to a user. Example 100 includes content provider 104, information provider 106, content distributor 102, communication networks 110, and user premises 120.

User premises 120 includes television receiver 122, display device 124, and newly installed storage device 132. Television receiver 122 is a computing device that receives audiovisual content for presentation to a user on display device 124. One example implementation of the infrastructure or environment in which embodiments described herein can be employed is discussed in more detail below.

As television receiver 122 receives content it temporarily buffers the content (e.g., for the current channel that the user is watching) or stores the content for longer periods of time (e.g., recording a program for later playback by the user). To store the received content, the television receiver 122 utilizes storage device 132.

Storage device 132 is communicatively coupled to television receiver 122 via communication link 115. The communication link 115 may be a wired connection, such as a USB cable, or it may be a wireless connection, such as a Bluetooth connection.

When a user newly connects storage device 132 to television receiver 122, television receiver 122 cannot immediately begin storing content on storage device 132. Rather, television receiver 122 has to pair with and initialize storage device 132. In many instances, this pairing and initialization phase takes a relatively long time to complete, sometimes as much as 30 minutes or more depending on the storage capacity of the storage device, the number of partitions previously on the storage device, the number of new partitions to provision on the storage device, the type or size of the file system to be utilized, formatting or deleting of previously stored content, or other storage device initialization tasks.

However, it may be undesirable to the user to wait while television receiver 122 pairs with and initializes storage device 132. Embodiments described herein provide a system and procedure for setting up storage device 132 to be quickly accessible for storing content. Briefly, television receiver 122 provisions an initial partition on storage device 132 without spending the time or computing resources to partition the entire storage capacity of storage device 132. This initial partition is utilized to both temporarily buffer content and to record long-term content. At some later point in time (e.g., at a predetermined time at night, when the television receiver enters an idle state, when a user initiates finalization), television receiver 122 partitions the remainder of storage device 132 and converts the initial partition into a viewing buffer, which is discussed in more detail herein.

As mentioned above, television receiver 122 receives audiovisual content for presentation to a user on display device 124. The following is a brief description of one example embodiment of the infrastructure and environment for providing audiovisual content to television receiver 122 for presentation to a user.

Typically, content providers 104 generate, aggregate, and/or otherwise provide audiovisual content that is provided to one or more users. Sometimes, content providers are referred to as "channels." Examples of content providers 104 may include, but are not limited to, film studios, television studios, network broadcasting companies, independent content producers, such as AMC, HBO, Showtime, or the like, or other entities that provide content for user consumption. A content provider may also include individuals that capture personal or home videos, and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports broadcasts, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the content provided by content provider 104. For example, this data may include metadata, program name, closed-caption authoring and placement within the content, timeslot data, pay-per-view and related data, or other information that is associated with the content. In some embodiments, a content distributor 102 may combine or otherwise associate the data from information provider 106 and the content from content provider 104, which may be referred to as the distributed content. However, other entities may also combine or otherwise associate the content and other data together.

Content distributor 102 may provide the content, whether content is obtained from content provider 104 and/or data from information provider 106, to a user through a variety of different distribution mechanisms. For example, in some embodiments, content distributor 102 may provide the content and data to a user's television receiver 122 directly through communication network 110 on communication link 111. In other embodiments, the content and data may be sent through uplink 112, which goes to satellite 114 and back to satellite antenna 116, and to the television receiver 122 via communication link 113.

In various embodiments, content provider 104, information provider 106, and content distributor 102 communicate with each other via communication network 110. Communication network 110 may be configured to couple various computing devices to transmit content/data from one or more devices to one or more other devices. For example, communication network 110 may be the Internet, X.25 networks, or a series of smaller or private connected networks that carry the content and other data. Communication network 110 may include one or more wired or wireless networks.

Television receiver 122 is a receiving device of the content from content distributor 102. The television receiver 122 is configured to receive the content from the content distributor 102 via communication network 110 and communication link 111 or via satellite antenna 116 and communication link 113. Television receiver 122 receives content via over-the-air signals captured by antenna 116, decodes the content, and provides it to display device 124. Display device 124 may be a television, monitor, or other display device. Although FIG. 1 illustrates the television receiver 122 providing content for display on the display device 124 on the user premises 120, embodiments are not so limited. In some other embodiments, the television receiver 122 provides the content to a user's mobile device, such as a smartphone, tablet, or other computing device, that is at a remote location to the user premises 120. Examples of television receiver 122 may include, but are not limited to, a set-top box, a cable connection box, a computer, or other content or television receivers.

Figure 2A:
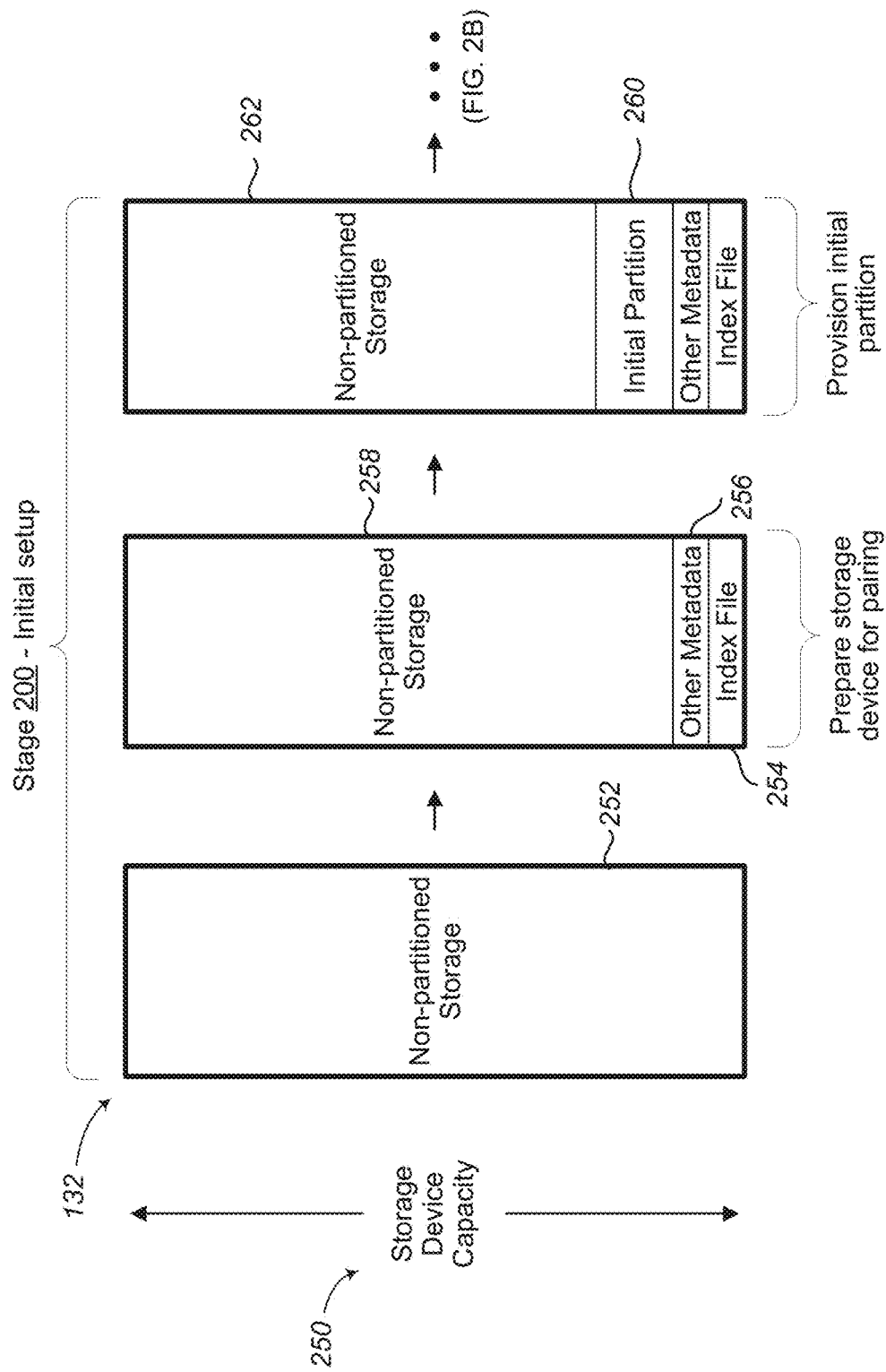
FIGS. 2A-2C show an illustrated example of the stages utilized by a television receiver to set up a storage device, in accordance with embodiments described herein.
Figure 2B:
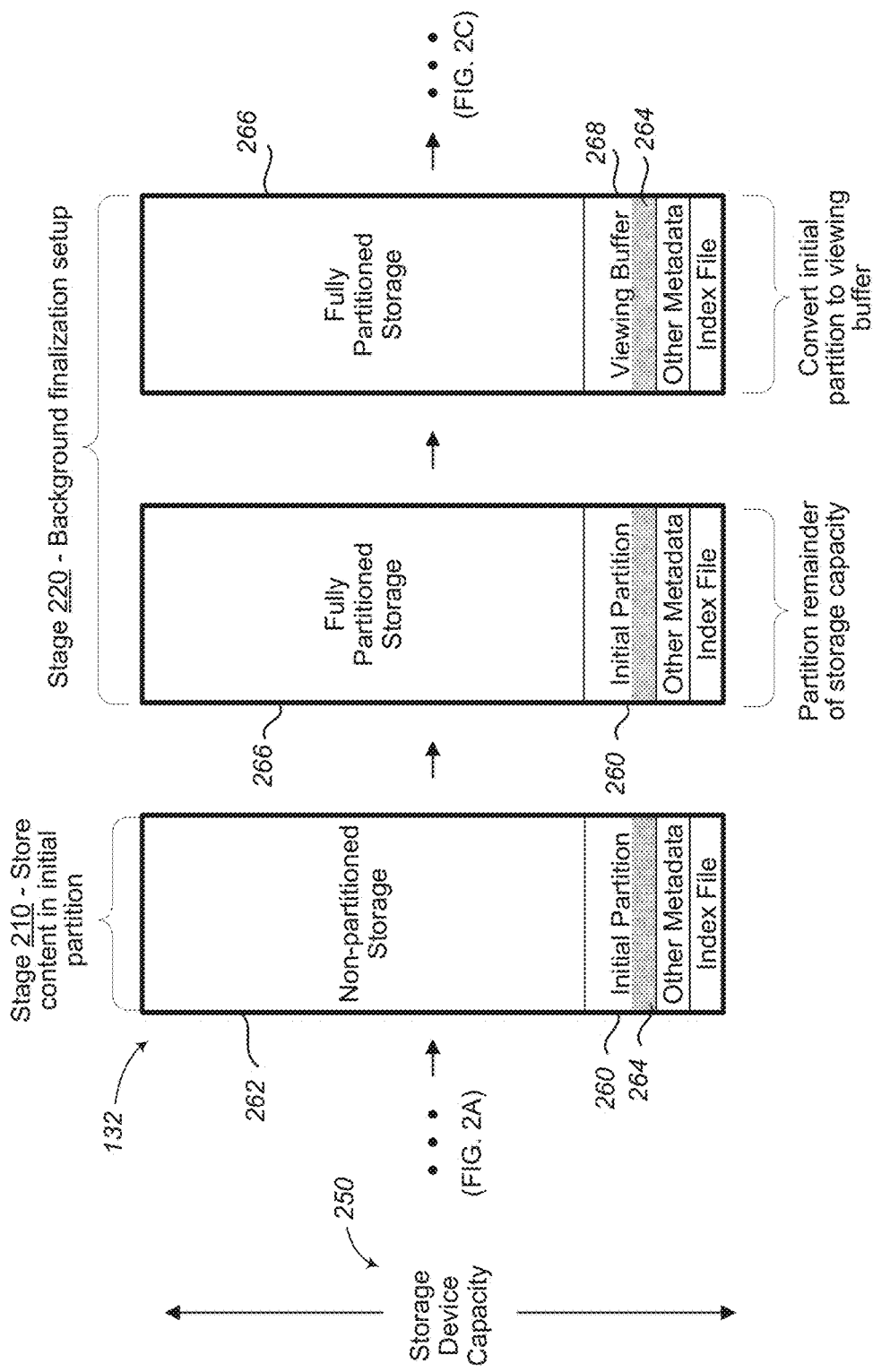
Figure 2C:
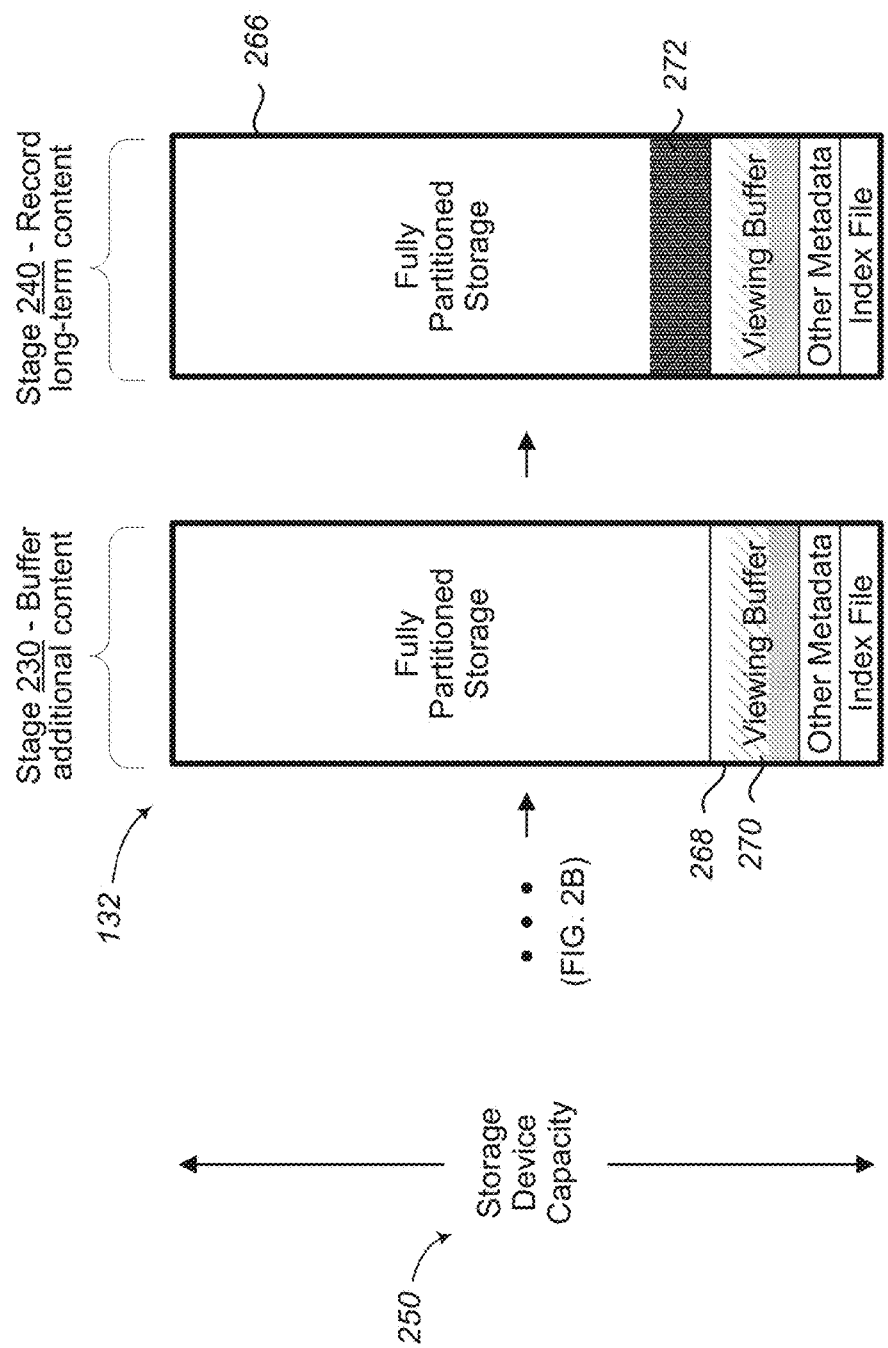

FIGS. 2A-2C show an illustrated example of the stages utilized by a television receiver to set up a storage device in accordance with embodiments described herein. In these illustrative examples, storage device 132 from FIG. 1 has a storage device capacity 250, which is the total storage capacity in which the television receiver can access and store data. In some embodiments, the storage device capacity 250 is the total amount of storage capacity of the storage device 132. In other embodiments, however, some of that total storage capacity may have been previously partitioned or utilized by another storage device. As described herein, in some embodiments, a television receiver pairs with a storage device so that only that television receiver can store and access the data stored on the storage device by that television receiver. Accordingly, previously stored data is not accessible to a different television receiver. Thus, storage device capacity 250 is the storage capacity available to the particular television receiver that the storage device is connected to, which can be less than the total amount of storage capacity of the storage device.

The data to be stored in the embodiments described herein is television content that is received by a television receiver. Although, embodiments are not so limited and other types of data can also be stored on storage device 132.

For ease of illustration, FIGS. 2A-2C show five stages, stages 200, 210, 220, 230, and 240, of the process for setting up storage device 132. It should be noted that one or more of stages 200, 210, 220, 230, and 240 may be considered to be combined into a one or more other stages or they may be separated into sub-stages for various different time periods depending on usage requirements of the television receiver or storage device 132 or when the television receiver determines when to proceed from one stage to the next. Moreover, various embodiments described herein may utilize additional stages not illustrated, such as those described in conjunction with FIG. 2D and FIGS. 2E-2F or described elsewhere herein.

Stage 200 in FIG. 2A shows an initial setup of storage device 132. Stage 200 begins with all of storage device capacity 250 of storage device 132 as non-partitioned storage portion 252. The television receiver generates index file 254 and other metadata 256 to be used in identifying and controlling the storage of content on the storage device 132. Index file 254 and other metadata 256 are stored on storage device 132 in non-partitioned storage portion 252, resulting in non-partitioned storage portion 258.

The television receiver then provisions initial partition 260 from non-partitioned storage portion 258, which results in non-partitioned storage portion 262. As described herein, initial partition 260 is accessible to the television receiver for storing content, but non-partitioned storage portion 262 is unavailable and inaccessible for storing content until storage device 132 is fully partitioned (e.g., after stage 220).

Stage 210 in FIG. 2B shows content 264 being stored in initial partition 260 after completion of the initial setup stage. The time to complete this first partition is relative brief, usually under 30 seconds and under 10 seconds in one embodiment. As shown, storage device capacity of initial partition 260 is utilized to store content 264, while non-partitioned storage portion 262 remains inaccessible to the television receiver to store content at this stage. In various embodiments, the television receiver continually stores content 264 in initial partition 260 with no modifications to the storage capacity size of initial partition 260 or to non-partitioned storage portion 262. In this way, initial partition 260 functions as a ring or FIFO buffer.

In response to a triggering event after initial partition 260 is provisioned, non-partitioned storage portion 262 is partitioned by the television receiver, illustrated as stage 220. As described herein, this finalization stage can be triggered by a number of different events, depending on the configuration of the television receiver. For example, stage 220 is initialized: in response to initial partition 260 being full; in response to initial partition 260 being filled beyond some threshold capacity that is less than full; at a particular time of day; in response to user input; in response to the television receiver being in, entering, or prior to, an idle condition (e.g., power down or power save mode or a lack of user interaction with the television receiver), or some other condition that initiates full partitioning of storage device 132.

Stage 220 in FIG. 2B shows the background finalization setup of storage device 132. Stage 220 begins with the television receiver provisioning non-partitioned storage portion 262 into fully partitioned storage portion 266. Fully partitioned storage portion 266 is now available for storing content received by the television receiver. In various embodiments, fully partitioned storage portion 266 is utilized by the television receiver to record long-term content, such as programs the user has selected to record for future playback.

Initial partition 260 is converted into viewing buffer 268 to be utilized by the television receiver to buffer content that is to be temporarily stored. In various embodiments, content 264 that was previously stored in initial partition 260 remains in viewing buffer 268 after the conversion from initial partition 260 to viewing buffer 268. In other embodiments, content 264 may be deleted, removed, moved to fully partitioned storage 266 or invalidated prior to initial partition 260 being converted to viewing buffer 268.

Although FIG. 2B illustrates provisioning non-partitioned storage portion 262 into fully partitioned storage portion 266 prior to converting initial partition 260 into viewing buffer 268, embodiments are not so limited. In other embodiments, initial partitioned 260 is converted into view buffer 268 prior to provisioning non-partitioned storage portion 262 into fully partitioned storage portion 266.

Stage 230 in FIG. 2C shows content 270 being temporarily stored in viewing buffer 268 after initial partition 260 is converted into viewing buffer 268. In various embodiments, the television receiver buffers content 270 associated with the current channel being watched by the user for a temporary amount of time, such as until viewing buffer 268 is full or the user changes the channel.

Stage 240 in FIG. 2C shows content 272 being stored in fully partitioned storage portion 266 as long-term recorded content. In various embodiments, the television receiver records content for longer periods of time based on user input for recording program content, preferences to store on-demand content for a period of time, user preferences to automatically record content that the user may be interested in, or other recording triggers.

Although stage 230 is illustrated as being before stage 240, embodiments are not so limited, and the order in which stage 230 and 240 are performed is dependent on the type of content being received and how it is to be recorded. In some embodiments, stage 240 is performed before stage 230, such as when the received content is to be permanently stored in fully partitioned storage portion 266, rather than temporarily buffering the content in viewing buffer 268. In other embodiments, stage 230 and stage 240 are performed in parallel such that some received content is buffered in viewing buffer 268 and other content is recorded in fully partitioned storage portion 266.

As described herein, once initial partition 260 is full, the television receiver can perform various different action based on its configuration or user settings. For example, the television receiver can 1) continue to utilize initial partition 260, such as by writing over other content stored in the initial partition 260, 2) modify or repartition initial partition 260 to include additional storage device capacity, 3) provision a second initial partition, 4) initiate the finalization setup of the storage device, or 5) query the user to select one of the forgoing actions to perform.

Figure 2D:
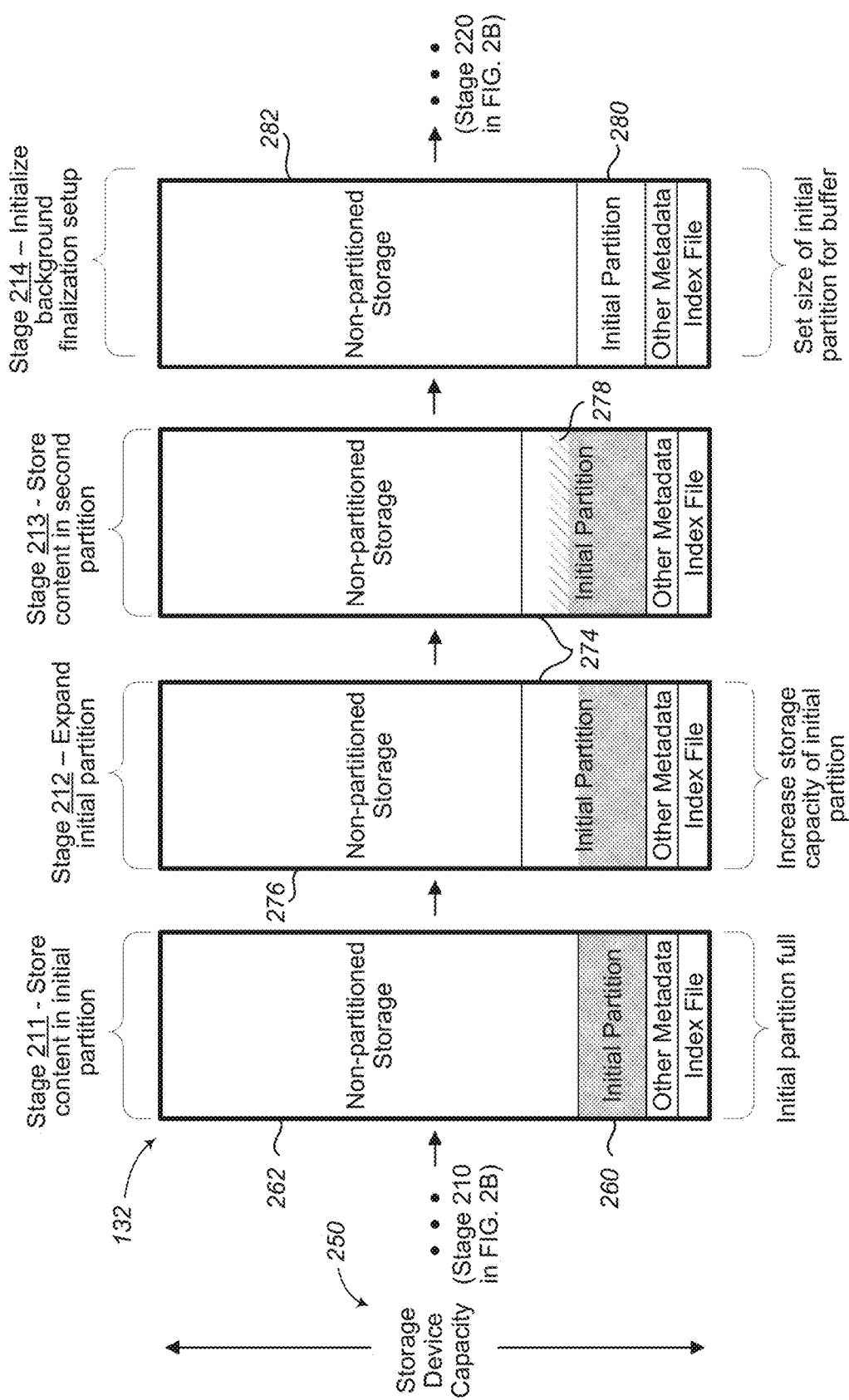
FIG. 2D shows an illustrated example of additional or alternative stages utilized by the television receiver to set up the storage device, in accordance with embodiments described herein.

FIG. 2D shows an illustrated example of additional or alternative stages utilized by the television receiver to set up the storage device, in accordance with embodiments described herein. As mentioned herein, in some embodiments, initial partition 260 is utilized as a ring buffer, or FIFO buffer, such that once full, it continually deletes or writes over the oldest stored content in initial partition 260 with newly received content, such as discussed above in conjunction with FIG. 2B. In other embodiments, however, in response to initial partition 260 being full, the storage capacity size of the initial partition 260 is expanded to have a larger storage capacity size.

Stage 211 in FIG. 2D proceeds after stage 210 and before stage 220 in FIG. 2B. As shown, initial partition 260 is full of stored content. In some embodiments, initial partition 260 is considered to be full when there is no remaining storage capacity in the memory space allocated as initial partition 260. In other embodiments, initial partition 260 is considered to be full when the utilized storage capacity of initial partition 260 reaches or exceeds a threshold value. For example, initial partition 260 may be deemed to be full when 80% of its total storage capacity is utilized.

In response to initial partition 260 being full, the television receiver expands the storage capacity of initial partition 260 to be some greater amount. Stage 212 in FIG. 2D shows initial partition 260 being reconfigured or re-provisioned to utilize an additional portion of storage capacity of non-partitioned storage portion 262, resulting in initial partition 272 and non-partitioned storage portion 276. In this way, the initial partition is expanded to include additional storage capacity, while reducing the storage capacity in the non-partitioned portion of the storage device.

Stage 213 in FIG. 2D shows additional content 278 being stored in the expanded initial partition 274. As shown, storage device capacity of expanded initial partition 274 is utilized to store content that is received by the television receiver, but non-partitioned storage portion 276 is not utilized by the television receiver. Once expanded initial partition 278 is full, the television receiver may again expand the storage capacity of initial partition 278, it may being to utilize expanded initial partition 278 as a ring buffer, it may provision a second initial partition, or it may initiate full partitioning of storage device 132 described in conjunction with stage 220 in FIG. 2B, as discussed herein.

In response to a triggering event that initiates the full partitioning of storage device 132, stage 214 in FIG. 2D shows the television receiver preparing or modifying the expanded initial partition in anticipation of convert the initial partition into a viewing buffer. As shown, the storage capacity of expanded initial partition 274 is modified to be set to a predetermined (or user defined) storage capacity size for the viewing buffer. In this example, the storage capacity of initial partition 274 is reduced to some smaller storage capacity for initial partition 280 (e.g., enough storage capacity for one hour of recorded high definition audiovisual content), which returns some of the storage capacity to the non-partitioned portion, which results in non-partitioned storage portion 282. After stage 214 in FIG. 2D, stage 220 continues as discussed above in conjunction with FIG. 2B with non-partitioned storage portion 282 being partitioned into fully partitioned storage portion 266 at stage 220 in FIG. 2B.

Figure 2E:
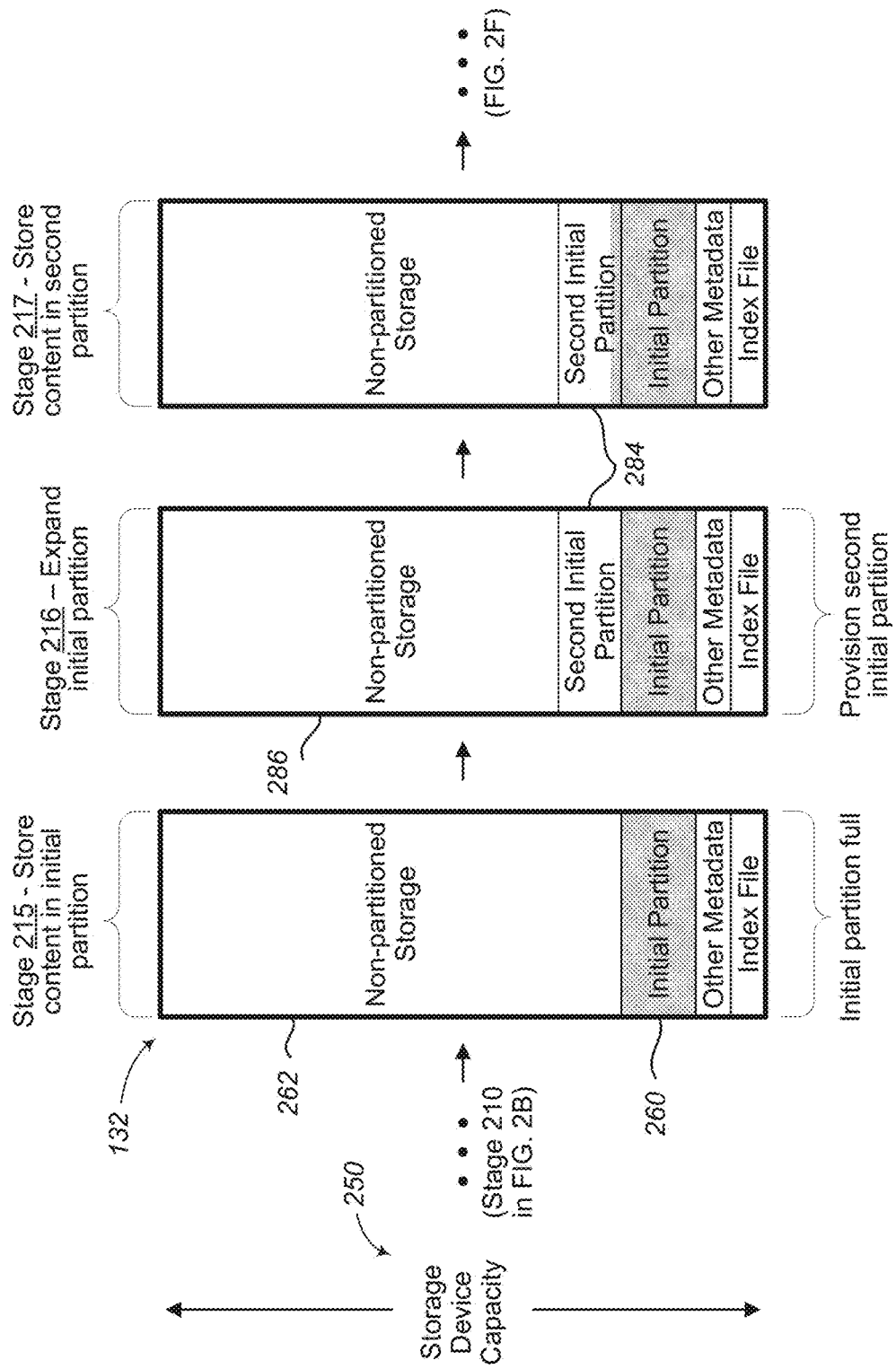

As mentioned herein, in some embodiments, a second initial partition is provisioned in response to the initial partition being full, which is described in more detail in conjunction with FIGS. 2E-2F. Stage 215 in FIG. 2E proceeds after stage 210 and before stage 220 in FIG. 2B. As shown, initial partition 260 is full of stored content. As described above, in some embodiments, initial partition 260 is considered to be full when there is no remaining storage capacity in the memory space allocated as initial partition 260, and in other embodiments, initial partition 260 is considered to be full when the utilized storage capacity of initial partition 260 reaches or exceeds a threshold value.

In response to initial partition 260 being full, the television receiver provisions a second initial partition. Stage 216 in FIG. 2D shows the provisioning of second initial partition 284 from non-partitioned storage portion 262, which results in non-partitioned storage portion 286. As described herein, second initial partition 286 becomes available and accessible for storing additional content similar to initial partition 260, but non-partitioned storage portion 286 remains unavailable and inaccessible for storing content.

Stage 217 in FIG. 2E shows content being stored in second initial partition 284. As shown, storage device capacity of second initial partition 284 is utilized to store content that is received by the television receiver, but non-partitioned storage portion 286 is not utilized by the television receiver. It should be noted that once second initial partition 284 is full, a third initial partition may be provisioned, second initial partition 284 may be modified to include additional storage capacity, initial partition 260 and second initial partition 284 may be reused such that older content is deleted or overwritten, or the finalization setup stage may be triggered to fully partition storage device 132 partitioning stage.

In response to a triggering event that initiates the full partitioning of storage device 132, stage 218 in FIG. 2F shows the television receiver preparing or modifying the second initial partition in anticipation of convert the initial partition into a viewing buffer. The full partitioning of the storage device will take much longer, about an hour in some embodiments, while in other embodiments, it might be 30 minutes or it might exceed 2 hours.

As discussed herein, in some embodiments, short-term, temporary content and long-term recorded content are stored in initial partition 260 and second initial partition 284. As illustrated in stage 218, the background finalization setup begins in by flushing the buffered short-term content from initial partition 260 or second initial partition 284, or both, which results in long-term recorded content 288 still being stored in initial partition 260 or second initial partition 284. Long-term recorded content 288 in second initial partition 218 is then moved to initial partition 260. In some embodiments, all content is flushed from second initial partition 284 regardless of whether it is temporarily buffered or recorded for longer term. Similarly, in some embodiments, all content is flushed from both initial partition 260 and second initial partition 284 regardless of whether it is temporarily buffered or recorded for longer term.

Second initial partition 284 is then removed from storage device 132, which results in non-partitioned storage portion 286 being expanded into non-partitioned storage portion 290. After stage 218 in FIG. 2F, stage 220 continues as discussed above in conjunction with FIG. 2B with non-partitioned storage portion 290 being partitioned into fully partitioned storage portion 266 at stage 220 in FIG. 2B.

The operation of certain aspects will now be described with respect to FIGS. 3-6. In at least one of various embodiments, processes 300, 400, 500, and 600 described in conjunction with FIGS. 3-6, respectively, may be implemented by or executed on one or more computing devices, such as television receiver 122 in FIG. 1.

Figure 3:
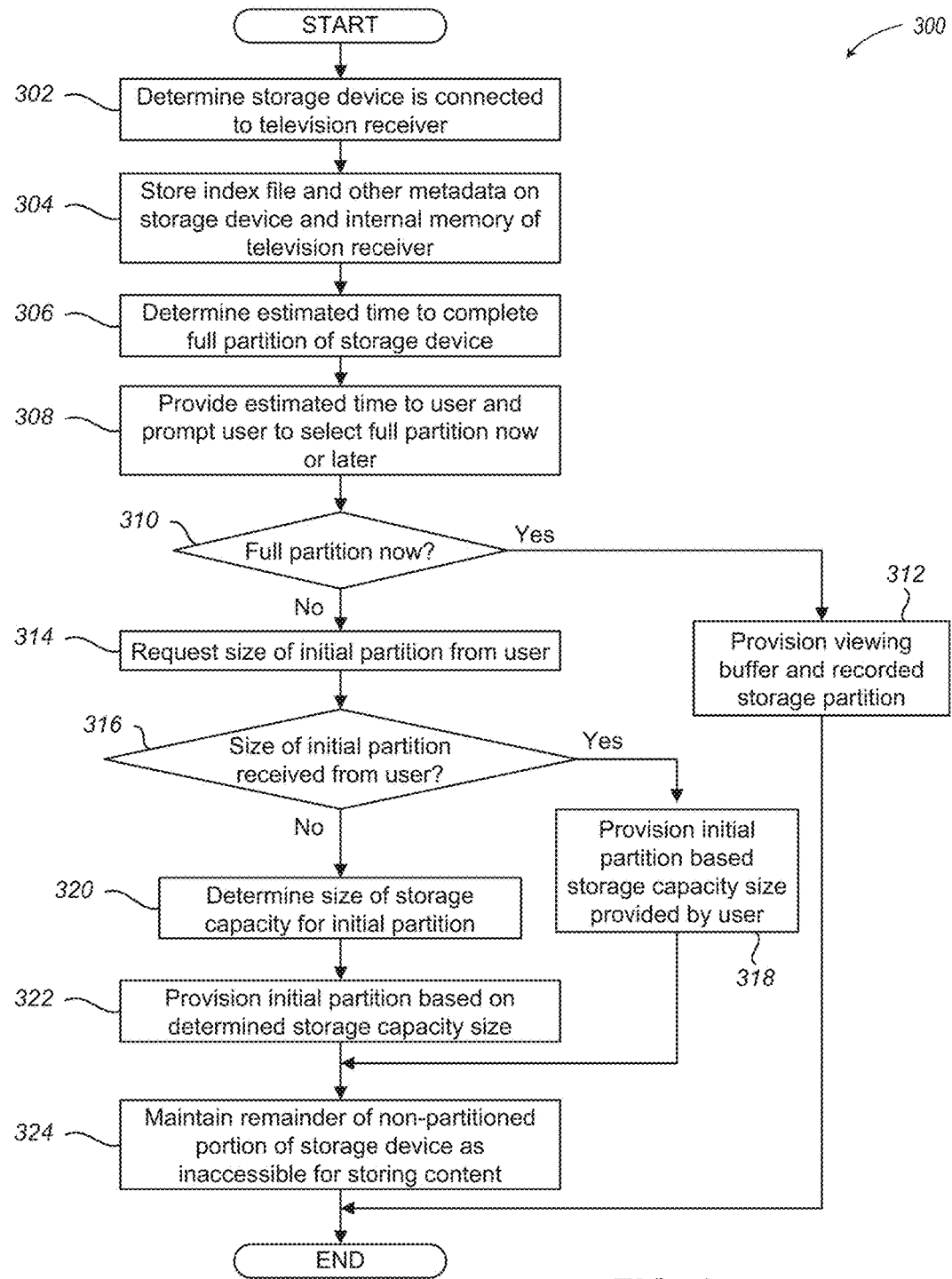
FIG. 3 illustrates a logical flow diagram generally showing one embodiment of a process for performing an initial setup of a storage device, in accordance with embodiments described herein.

FIG. 3 illustrates a logical flow diagram generally showing one embodiment of a process performed by a television receiver for providing an initial setup of a storage device in accordance with embodiments described herein. Process 300 begins, after a start block, at block 302, where a new storage device is determined to be communicatively connected to the television receiver. The storage device may be connected to the television receiver via a USB wired connection or other wired connection, or it may be connected via a wireless connection. The television receiver identifies that the storage device is connected to the television receiver by using the particular standards associated with the type of connection.

In some embodiments, the storage device is an external storage device that is separate from the television receiver. For example, the new storage device may be an external storage device that is now connected to the television receiver, such as to augment the storage capacity of the television receiver. In other embodiments, the storage device is internal to or part of the television receiver. For example, the new storage device may be an internal storage device that is an aftermarket storage device that is internally connected to the television receiver, such as to replace a previous internal storage device of the television receiver.

Process 300 proceeds to block 304, where an index file and other metadata are stored on the storage device and on an internal memory of the television receiver. Storage of the index file and metadata on both devices, pairs to two devices together so that the television receiver can identify and utilize the storage device to store and retrieve data. In various embodiments, this dual storage of the index file and metadata prevents other television receivers from accessing content or information stored on the storage device by the television receiver that stored the index file. In other words, data is stored based on the pairing between the television receiver and the storage device and is inaccessible to other television receivers. Although other embodiments may not have such restrictions on which television receivers can access data stored on the storage device.

In various embodiments, the index file and other metadata store various different types of information associated with the storage device and the television receiver, such as, for example, filesystem in which data is stored on the storage device; number, size, and location of partitions; identification information for the storage device and the television receiver; encryption codes and information, and other data. In some embodiments, the television receiver selects a particular filesystem suitable for the file format to utilize by the television receiver, such as, for example, XFS, FAT, proprietary filesystems, or other filesystems. In other embodiments, the storage device may have a predetermined filesystem.

Process 300 continues at block 306, where an estimated time to complete a full partition of the storage device is determined. In various embodiments, the estimated time to perform a full partition is based on the storage capacity of the storage device, the type of filesystem utilized, the number of partitions, and other parameters of the storage device. In at least one embodiment, the television receiver accesses a table, either stored locally or accessed remotely, which lists various different combinations of storage device parameters and the estimated time to complete a full partition of the storage device based on those combinations of parameters. In general, the higher the storage capacity of the storage device, the more complex the filesystem, or the more partitions to manage, the longer it will take the television receiver to perform a full partition, or full setup or pairing, of the storage device.

Process 300 proceeds next to block 308, where the estimated time to perform the full partition of the storage device is provided to the user, and the user is prompted to select whether the television receiver performs the full partition now or at a later time. As mentioned herein, it may take 30 minutes or more to fully partition a high-capacity storage device, e.g., multiple terabytes. However, this amount of time may be unacceptable to the user at the time when the user sets up the television receiver, e.g., because the user wants to start watching television right away. Accordingly, the user can utilize the estimated time to complete the full partition to make a decision and select whether to have the full partition occur now or at a later time, such as when the user is not watching television or when the television receiver is in an idle condition.

Process 300 continues next at decision block 310, where a determination is made whether to fully partition the storage device now or at a later time. This determination is based on the user's selection of having the television receiver fully partition the storage device now or at a later time. If the user selects to fully partition the storage device now, then process 300 flows to block 312; otherwise, process 300 flows to block 314. In various embodiments, the user may not be provided this option and the initial partition may be prepared automatically. This automation makes it much simpler for the user to setup the storage device, while the television receiver is still providing storage-related functionality to the user for a reasonable amount of time.

At block 312, the television receiver provisions a viewing buffer and at least one long-term storage partition. The viewing buffer temporarily stores audiovisual content for a predetermined amount of time or until a predetermined amount of storage capacity is utilized. Once the predetermined amount of time has expired or the predetermined amount of storage capacity has been utilized the buffered content is deleted or otherwise overwritten by new content to be buffered. This viewing buffer is typically used to temporarily store content associated with a current channel being watched by a user, which allows the user to seek back and replay content for a limited time, among other actions. In some embodiments, the viewing buffer may be in the same partition as the recorded storage partition, allows the user to, at any point, decide to make the content they are viewing permanent, i.e., convert it into a recording.

In contrast, the long-term storage partition(s) is(are) utilized to store content to be recorded for long term until a user deletes the content or until a larger time period has elapsed or predetermined amount of storage capacity is utilized (e.g., entire storage capacity of the storage device is full). The long-term storage partition is typically used to store content for programs that the user or the television receiver has selected to save for the user, whether or not the user is currently viewing the channel associated with that program. This type of storage allows for time shifting the viewing of the saved program.

In various embodiments, the index file and other metadata stored by the television receiver and the storage device is updated with various parameters of the initial partition.

After block 312, process 300 terminates or otherwise returns to a calling process to perform other actions.

If, at decision block 310, the full partition is to be completed at a later time, process 300 flows from decision block 310 to block 314. At block 314, the television receiver requests a size of the initial partition from the user. In various embodiments, the requested size may be in terms of hours of content to store, e.g., two hours of user selected or user viewed audiovisual content. In some embodiments, block 314 may be optional and may not be performed.

Process 300 proceeds to decision block 316, where a determination is made whether a size of the initial partition is received from the user. If the user has provided a size of the initial partition, process 300 flows to block 318; otherwise process 300 flows to block 320.

At block 318, an initial partition of the storage device is provisioned to be accessible for storing content received by the television receiver. The size of the initial partition is based on the size provided by the user. In some embodiments, the television receiver converts the requested time duration from the user into an estimated storage capacity size, which is used as the size of the initial partition. In various embodiments, the size of the initial partition is less than the maximum storage capacity of the storage device such that a remainder of the storage device remains unpartitioned. After block 318, process 300 proceeds to block 324.

If block 314 is not performed and no size of initial partition is requested from the user, then decision block 316 and block 318 are not performed and process 300 proceeds from decision block 310 to block 320. Similarly, if, at decision block 316, the user does not provide a size of the initial partition, process 300 flows from decision block 316 to block 320.

At block 320, a storage capacity size for the initial partition is determined. In some embodiments, the size of the initial partition is predetermined, such as, for example, sufficient storage capacity for storing one hour of high definition audiovisual content. In other embodiments, the size of the initial partition may be determined based on the current time or day or the computing resource utilization of the television receiver.

For example, in at least one embodiment, the television receiver determines a time period between the current time when the storage device is connected to the television receiver and an estimated time when the television receiver should be in an idle condition or state, which may be referred to as an estimated idle time. In some embodiments, the estimated idle time is preprogrammed into the television receiver. In other embodiments, the estimated idle time is provided by a user or by a technician or administrator.

As an example, the estimated idle time may indicate that the television receiver should be in an idle condition or state between 1:00 AM and 4:00 AM. In such an example, if the current time is 8:00 PM, then the determined time period from the current time to the estimated idle time is five hours, or the difference from 8:00 PM to 1:00 AM. In this way, the television processor can determine that the size of storage capacity for the initial partition is sufficiently large to store five hours of audiovisual content.

In another example, if the current time is 3:00 AM, then the determined time period from the current time to the estimated idle time is zero hours since the current time is at time when the television receiver is expected to be in an idle condition. In this case, a default storage capacity size for the initial partition is utilized.

In some other embodiments, the idle time is determined based on the user's utilization of the television receiver or the computing resource utilization of the television receiver. For example, in some embodiments, the television receiver track patterns of when the user is not watching television, such as the user not changing channels or otherwise interacting with the television receiver, or tracks patterns in the amount of processing power or memory being utilized by the television receiver. If a pattern can be detected, then such patterns can indicate an estimate idle time.

For example, the patterns may indicate that there is very little processor power being utilized in the middle of the day during weekdays and that the user is not changing channels during this timeframe. Such a pattern may indicate that the user is away from the television receiver, e.g., at work. In one example, if various usage patterns indicate that the estimated idle time or period is 8:00 AM to 5:00 PM, Monday through Friday, then the television receive can determine the storage capacity size for the initial partition based on the current time of day in relative to this estimated idle time. For example, it is currently 6:00 PM on Friday, then the determined time period between the current time and the estimated idle time is 62 hours. In this case, the television receiver can determine the size of the initial partition to be a sufficient size to store 62 hours of audiovisual content or some portion or percentage size of the determined time period, e.g., 10% or sufficient storage capacity for approximately six hours of high definition audiovisual content.

Process 300 continues next at block 322, where the initial partition of the storage device is provisioned to be accessible for storing content received by the television receiver based on the determined storage capacity size. However, the size of the initial partition is less than the maximum storage capacity of the storage device. The initial partition is accessible to the television receiver for buffering, recording, or otherwise storing program content. In various embodiments, the index file and other metadata stored by the television receiver and the storage device is updated with various parameters of the initial partition.

Process 300 proceeds next to block 324, where a remainder of the non-partitioned portion of the storage device is maintained as being inaccessible for storing content. Accordingly, the portion of the storage device that is not part of the initial partition, and is not storing the index file and other metadata, is inaccessible to the television receiver for buffering, recording, or otherwise storing program content. In other words, the television receiver cannot store any data in the non-partitioned portion of the storage device until that remainder portion is fully partitioned, as discussed in more detail below in conjunction with FIGS. 4-6.

By partitioning only an initial portion, and not all, of the storage capacity of the storage device, the television receiver can begin performing additional tasks and functions, rather than spending time partitioning the entire storage device. In this way, the user can begin to watch program content much faster.

After block 312, process 300 terminates or otherwise returns to a calling process to perform other actions.

After the storage device is initially setup in FIG. 3, e.g., with the initial partition being accessible for storing content and the non-partitioned portion being inaccessible for storing content, process 400 is utilized to receive and store audiovisual content.

Figure 4:
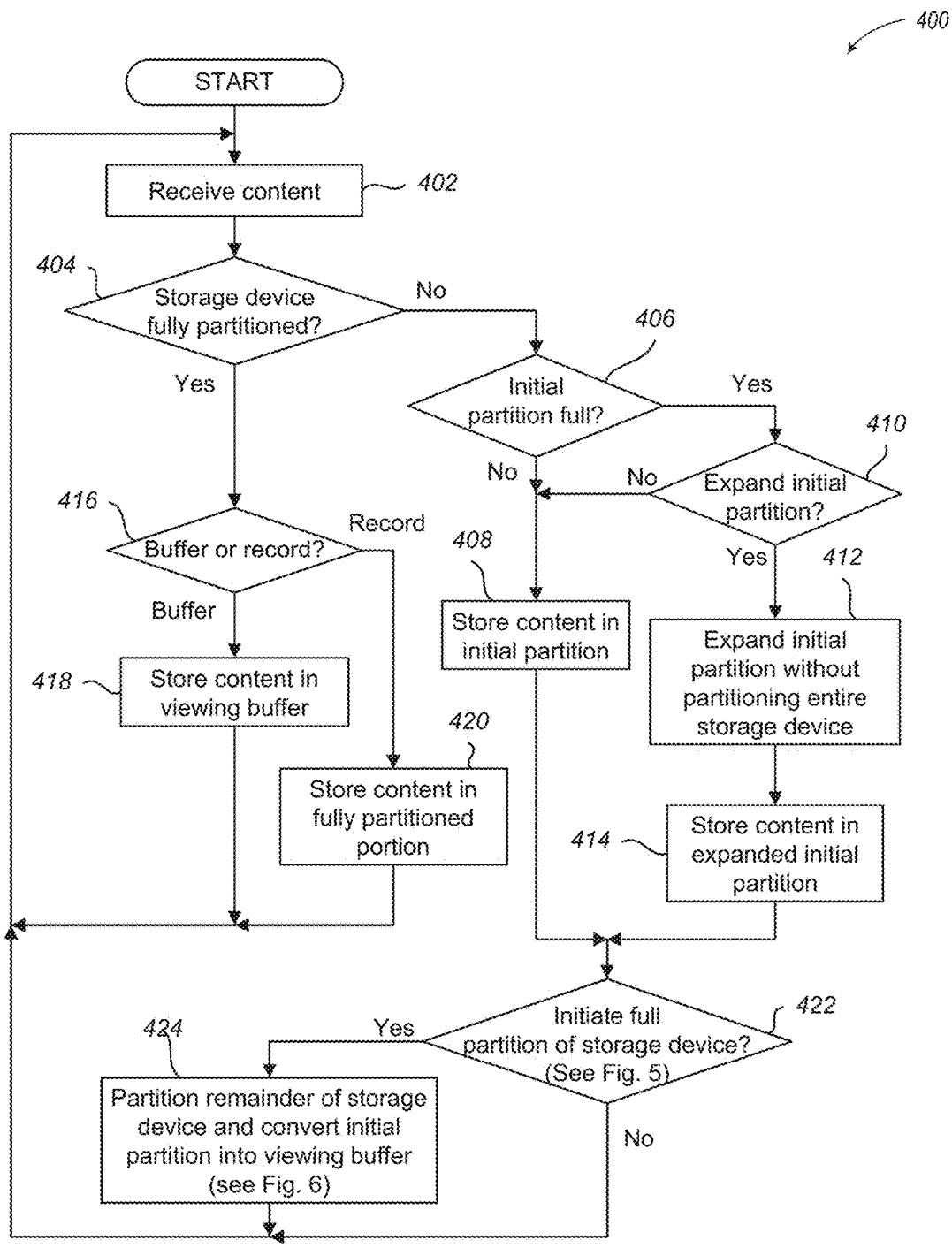
FIG. 4 illustrates a logical flow diagram generally showing one embodiment of a process for storing data on a storage device, in accordance with embodiments described herein.

FIG. 4 illustrates a logical flow diagram generally showing one embodiment of a process performed by a television receiver for storing data and finalizing setup of a storage device in accordance with embodiments described herein. Process 400 begins, after a start block, at block 402, where program content is received by the television receiver. In various embodiments, the television receiver utilizes one or more tuners to receiver program content to store on the storage device. In some embodiments, this program content is the content being currently displayed to the user on a currently selected channel. In other embodiments, this program content is associated with another, non-selected channel, but the user has selected that program content to be recorded by the television receiver.

Process 400 proceeds to decision block 404, where a determination is made whether the storage device is fully partitioned, or if it is only initially partitioned. As mentioned above, the storage device may be partially partitioned upon initial setup at blocks 318 or 324 in FIG. 3, or it may be fully partitioned at block 312 in FIG. 3 or in block 424 described in more detail below and in conjunction with FIG. 6.

In various embodiments, the television receiver maintains metadata indicating whether the storage device has been fully partitioned or not. In other embodiments, the metadata or index file on the storage device indicated whether or not it has been fully partitioned. If the storage device has been previously fully partitioned, then process 400 flows to decision block 416; otherwise, process 400 flows to decision block 406.

At decision block 406, a determination is made whether the initial partition is full. In various embodiments, the television receiver maintains a status of the initial partition to determine if the initial partition is full or if there is still storage capacity in the initial partition to store the received content. In other embodiments, the storage device stores a flag, tag, or other information indicating that the initial partition is full. If the initial partition is not full, process 400 flows to block 408, where the received content is stored in the initial partition; otherwise, process 400 flows to decision block 410.

At decision block 410, a determination is made whether to expand the initial partition. In some embodiments, the television receiver is preprogrammed to utilize only the initial partition and not to expand the initial partition, or it is preprogrammed to expand the initial partition when needed. In other embodiments, the television user may prompt the user to provide input as to whether to expand the initial partition or not. In some embodiments, settings of the television receiver or of the storage device may indicate whether the initial partition is not to be expanded, whether it can be expanded, or a maximum number of times that it may be expanded. As described herein, the initial partition may be expanded by modifying the amount of storage capacity associated with the initial partition or provisioning additional initial partitions. If the initial partition is to be expanded, process 400 flows to block 412; otherwise, process 400 flows to block 408.

At block 412, the initial partition is expanded to include additional storage capacity without partitioning the entire store device. In some embodiments, this expansion includes provisioning a second initial partition from the remainder of the non-partitioned portion of the storage device without partitioning all of the remainder of the storage device. In other embodiments, the expansion of the initial partition may include re-partitioning the initial partition to have a storage capacity that is larger than the original initial partition.

Process 400 continues at block 414, where the received content is stored in the expanded initial partition. After block 414, process 400 flows to decision block 422.

If, at decision block 410, the initial partition is not expanded, process 400 flows from decision block 410 to block 408. At block 408, the received content is stored in the initial partition. In some embodiments, only content to be buffered is stored in the initial partition. In other embodiments, the received content is stored in the initial partition regardless of whether it is content to be temporarily buffered or recorded for a longer duration.

If the initial partition is not full, the received content is stored in an empty portion of the initial partition. If the initial partition is full, the oldest content in the initial partition is discarded, deleted, or otherwise over written with the received content, which effectively creates a ring buffer or a looped FIFO buffer. In some embodiments, however, buffered data stored in the initial partition may be deleted or overwritten to make room for the newly received content, while not impacting the recorded content.

In various embodiments, the initial storage may have been previously expanded to include a second or additional initial partition or an expanded initial partition. In various embodiments, the original initial partition and the expanded second initial partition may be collectively referred to as the initial partition. Accordingly, in some embodiments, where the initial partition was previously expended, the received content may be stored in the original initial partition or the expanded second initial partition depending on the size of the received content and the amount of available storage in the original or expanded initial partition. In some embodiments, buffered content is stored in the original initial partition, while recorded content is stored in the expanded second initial partition.

In any event, the initial partition (original or expended) is the only portion of the storage device accessible for storing the received content until the storage device is fully partitioned at block 424, at which point the content to be temporarily buffered is stored in the converted initial partition buffer (e.g., at block 418) and the content to be recorded for a longer duration is stored in the fully partitioned portion (e.g., at block 420), as described in more detail below.

After block 408, process 400 flows to decision block 422.

At decision block 422, a determination is made whether to initiate full partition of the storage device, which is described in more detail below in conjunction with FIG. 5. Briefly, however, the full partition may be initiated in response to a request from a user, if the television receiver enters an idle condition or state, or at a particularly scheduled time. If full partition of the storage device is to be initiated, process 400 flows to block 424, otherwise, process 400 loops to block 402 to receive additional content. In various embodiments, process 400 may continuously loop while content is being received.

At block 424, the initial partition previously setup by the television receiver is converted into a viewing buffer and the remainder of the storage device is partitioned, which is described in more detail below in conjunction with FIG. 6. Briefly, the television receiver provisions the remainder of the storage device to be accessible for storing long-term content, while maintaining the initial partition as a buffer for temporary storage, e.g., buffering one hour of program content being displayed to the user. After block 424, process 400 loops to block 402 to receive additional content. In various embodiments, process 400 may continuously loop while content is being received.

If, at decision block 404, the storage device was previously fully partitioned, process 400 flows from decision block 404 to decision block 416. At decision block 416, a determination is made whether or not to buffer or record the received content. As mentioned above, the content is buffered for the program content that the user is currently watching, whereas the content is recorded (i.e., stored for later retrieval) if the user or the television receiver has selected to record the program content, whether or not the user is watching the channel associated with that content.

In various embodiments, content to be buffered is content that is to be temporarily stored for a predetermined amount of time or until a predetermined amount of storage capacity is utilized (e.g., the initial converted buffer is full). Once the predetermined amount of time has expired or the predetermined amount of storage capacity has been utilized the buffered content is deleted or otherwise overwritten by new content to be buffered. In contrast, content to be recorded is content that is to be stored for long term until a user deletes the content or until a larger time period has elapsed or predetermined amount of storage capacity is utilized (e.g., entire storage capacity of the storage device is full).

If the received content is to be buffered, process 400 flows to block 418, where the received content is stored in the viewing buffer. As described herein, the viewing buffer may be provisioned when the storage device is fully partitioned at block 312 in FIG. 3 or it may be created by converting the initial partition into the viewing buffer, as described in more herein in conjunction with block 424 and FIG. 6. Otherwise, process 400 flows to block 420, where the received content is stored in the fully partitioned portion of the storage device.

After blocks 418 and 420, process 400 returns to block 402 to receive additional content. In various embodiments, process 400 may continuously loop while content is being received.

Figure 5:
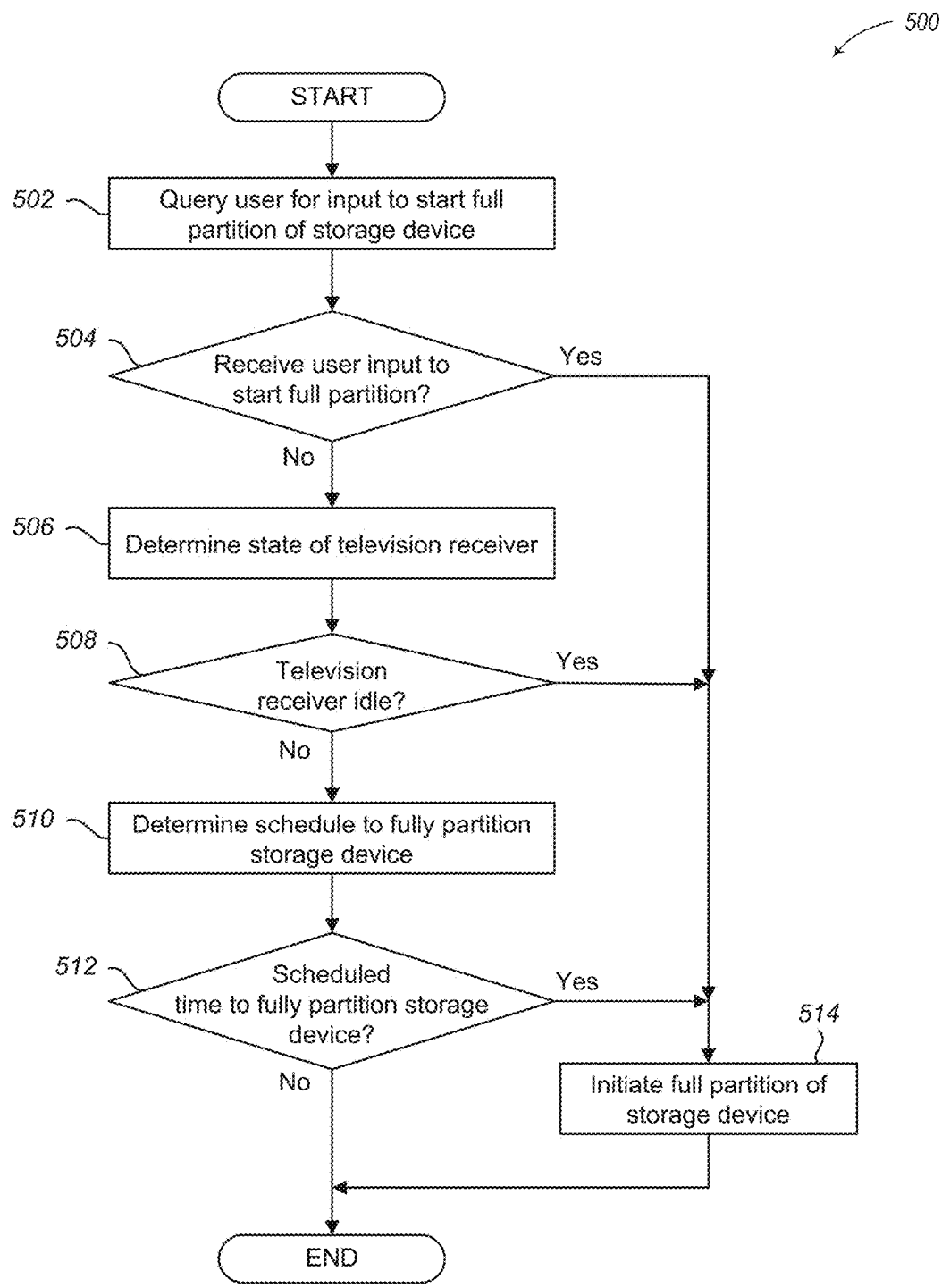
FIG. 5 illustrates a logical flow diagram generally showing one embodiment of a process for determining when to initiate a full partition of a storage device, in accordance with embodiments described herein.

FIG. 5 illustrates a logical flow diagram generally showing one embodiment of a process for determining when to initiate a full partition of a storage device, in accordance with embodiments described herein. Process 500 begins, after a start block, at block 502, where a user is queried for input as to when to initiate the full partition of the storage device. As described herein, the full partitioning may take quite a long time. So, the user may want to delay or postpone the full partitioning for some time.

In various embodiments, the television receiver provides a graphical user interface to the user, which allows the user to initiate or decline to initiate full partitioning of the storage device. In some embodiments, the graphical user interface is provided to the user at predetermined times of the day, when the user beings to interact with the television receiver, when the initial partition is filled to or above a threshold capacity, or at some other time. In other embodiments, the user can manually select to initiate the full partitioning of the storage device without being prompted. In some embodiments, the user is not queried and blocks 502 and 504 are not performed.

Process 504 proceeds to decision block 504, where a determination is made whether the user provided input to initiate the full partition of the storage device. If the user provided input to initiate the full partition of the storage device, process 500 flows to block 514; otherwise, process 500 flows to block 506.

At block 506, a state or condition of the television receiver is determined. This state or condition may be an idle condition, a high usage condition, update condition, or other operational states or conditions of the television receiver.

In various embodiments, the state or condition may be determined based on the resource utilization of the television receiver. In some embodiments, the television receiver monitors the processing power used by one or more central processing units, internal memory utilization, or other computing resource utilization of the television receiver. Higher amounts of resource utilization may indicate that the television receiver is in a high usage condition, where low resource utilization may indicate that the television receiver is in an idle condition. Accordingly, one or more different threshold values of computing resource utilization may be utilized to determine the state or condition of the television receiver.

In other embodiments, the resource utilization may also include monitoring the interactions between the user and the television receiver. For example, such monitoring may track how often or when was the last time the user changed the channel, turned the volume up or down, accessed the electronic program guide, or performed some other function on the television receiver. A lack of interaction by the user may indicate that the television receiver is in or can enter an idle condition, whereas continuous interaction by the user may indicate that the television receiver is currently being used by the user and cannot enter an idle condition. Accordingly, one or more different thresholds of user interactions may be utilized to determine the state or condition of the television receiver.

In yet other embodiments, the user may manually change the state or condition of the television receiver. For example, the television receiver may be put into an idle condition in response to the user putting the television receiver into a power save mode. In various embodiments, the television receiver may maintain a tag or other indicate of its current state or condition. Such a tag would dynamically update based on changes in the television receivers state or condition.

Process 500 continues to decision block 508, where a determination is made whether the television receiver is in an idle condition or state. If the television receiver is in an idle condition or state, then process 500 flows to block 514; otherwise, process 500 flows to block 510.

At block 510, a schedule to fully partition the storage device is determined. In various embodiments, the schedule may indicate that the full partition is to occur at a particular time of day (e.g., 1:00 AM the next morning).

In various embodiments, the scheduled time to initiate the full partition is determined based on the estimated time to complete the full partition, such as is determined at block 306 in FIG. 3, and an estimated idle time of the television receiver. The estimated idle time may be predetermined or it may be determined based on user usage, computing resource utilization, user input, or a combination thereof.

In some embodiments, if the estimated time to complete the full partition is greater than the estimated idle time, then initiation of the full partition may be delayed until a larger estimated idle time is determined. For example, if the estimated time to complete the full partition is one hour, but there is an estimated idle time of 30 minutes at 100 PM on Monday and two hours at 10:00 PM on Monday, then the television receiver may delay the full partitioning until 10:PM.

In other embodiments, if the estimated time to complete the full partition is greater than the estimated idle time, then initiation of the full partition may be separated into multiple scheduled time windows. For example, if the estimated time to complete the full partition is one hour, but there is only an estimated idle time of 30 minutes at 1:00 AM on Monday and 30 minutes at 2:00 AM on Tuesday, then the television receiver may initiate a partial partition of the currently non-partitioned portion of the television receiver at 1:00 AM on Monday, and then complete the partitioning at 2:00 AM on Tuesday.

In yet other embodiments, other types of scheduling techniques may be utilized to determine a time on when to initiate full partition of the storage device. At the scheduled time to fully partition the storage device, process 500 flows to block 514; otherwise, process 500 returns to a calling process to perform other actions (e.g., receive additional content at block 402 in FIG. 2).

Figure 6:
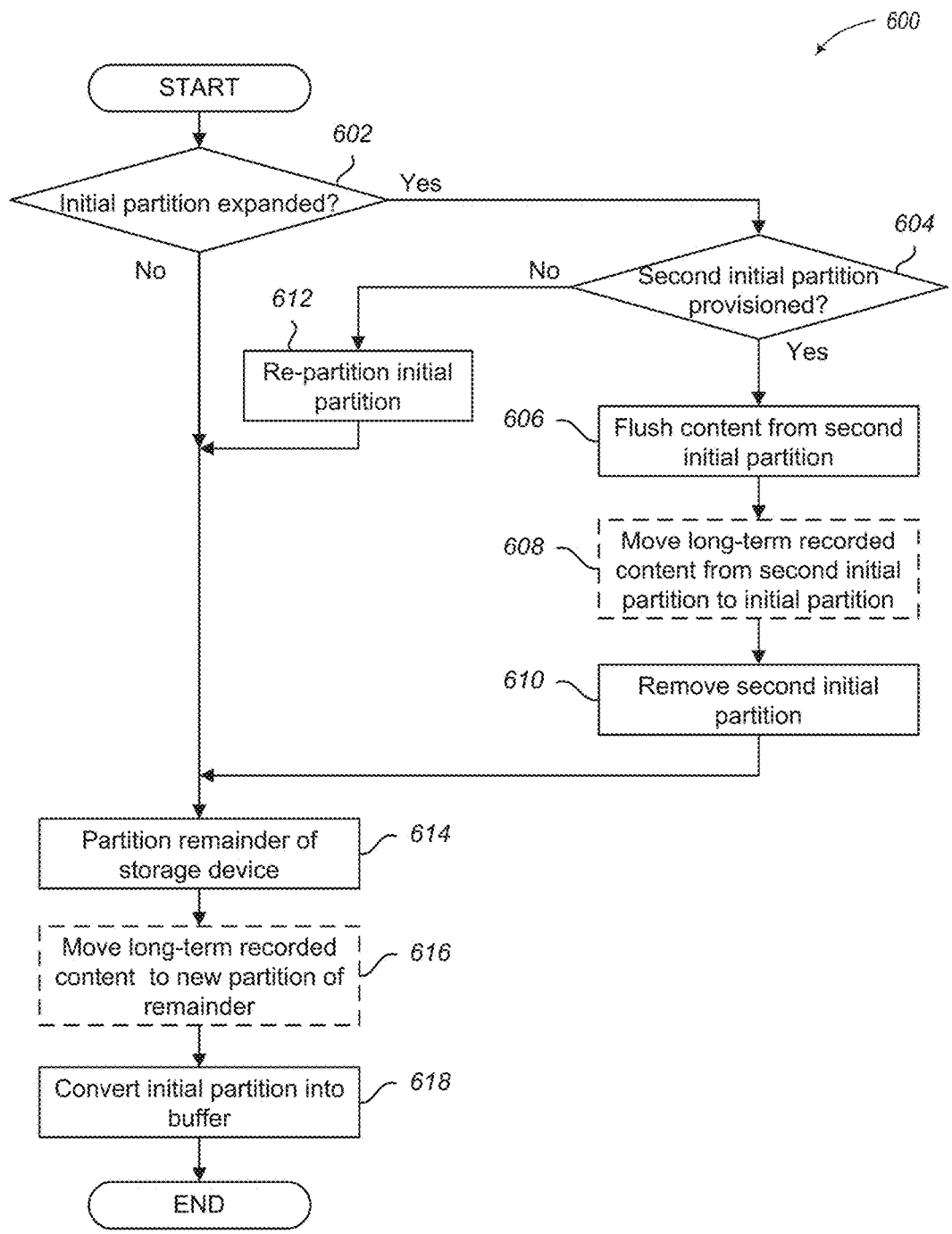
FIG. 6 illustrates a logical flow diagram generally showing one embodiment of a process for finalizing setup of a storage device, in accordance with embodiments described herein.

FIG. 6 illustrates a logical flow diagram generally showing one embodiment of a process for finalizing setup of a storage device in accordance with embodiments described herein. Process 600 begins, after a start block, at decision block 602, where a determination is whether the initial partition was expanded (e.g., at block 412 in FIG. 4). As described herein, in some embodiments, the initial partition is expanded or modified in response to the initial partition being full, while in other embodiments, the initial partition is not expanded or modified. If the initial partition is not expanded, process 600 flows to block 614; otherwise, process 600 flows to decision block 604.

At decision block 604, a determination is made whether a second initial partition is provisioned. As mentioned herein, in some embodiments where the initial partition is full, the television receiver provisions a second initial partition to store additional content without fully partitioning the entire storage device. In other embodiments, the initial partition is re-provisioned to include an increased storage capacity. If a second initial partition is provisioned, process 600 flows to block 606; otherwise, process 600 flows to block 612.

At block 606, content stored in the second initial partition is flushed, deleted, ignored, or otherwise considered invalid. By flushing this content, the storage capacity associated with the second initial partition is freed up and can be combined with remainder of non-partitioned storage capacity.

In some embodiments described herein, the initial partition and the second initial partition may store both temporarily buffered content and long-term recorded content. In such an embodiment, the buffered content in the initial partition and the second initial partition is flushed deleted, ignored, or otherwise considered invalid such that the resulting stored recorded content between the initial partition and the second initial partition is the same or smaller than the storage capacity size of the initial partition.

Process 600 proceeds to block 608, where long-term recorded content stored in the second initial partition is moved to the initial partition. In some embodiments, block 608 is optional and is not performed, such as if all content is flushed from the second initial partition.

Process 600 continues at block 610, where the second initial partition is removed. In various embodiments, removal of the second initial partition includes updating the index file stored on the television receiver and the storage device to indicate that that second initial partition is now part of the non-partitioned remainder portion of the storage device. After block 610, process 600 proceeds next to block 614.

If, at decision block 604, the initial partition is expanded but a second initial partition is not provisioned, process 600 flows from decision block 604 to block 612. At block 612, the initial partition is re-partitioned to have its original storage capacity size. In some other embodiments, the initial partition is re-partitioned to some other predetermined storage capacity size. In at least one embodiment, re-partitioning the initial partition includes flushing, deleting, ignoring, or otherwise considering invalid the content stored in the expanded initial partition. After block 612, process 600 continues at block 614.

If, at decision block 602, the initial partition is not expanded, process 600 flows from decision block 602 to block 614. At block 614, the remainder non-partitioned portion of the storage device is partitioned to now be accessible for storing content. In various embodiments, the remainder of the partitioning may include provisioning one or more partitions to permanently (or at least for a predetermined amount of time) store program content. For example, in some embodiments, a separate partition can be setup for each separate user of the television receiver. In other embodiments, one partition may be dedicated to storing "free" content, such as from channels included in the user's programming subscription, and another partition may be dedicated to storing additional paid content, such as movies or shows purchased by the user through an on-demand service. In various embodiments, the index file and other metadata stored by the television receiver and the storage device is updated with various parameters of the new partitioned portion of the storage device.

Process 600 continues at block 616, where long-term recorded content in the initial partition is moved to the new partition. As mentioned above, in some embodiments, the initial partition or the second initial partition stores long-term recorded content. This content is then moved from the initial portion to the new partition and stored in accordance with long-term recorded content (e.g., at block 420 in FIG. 4). In various embodiments, block 616 is optional and is not performed, such as if the all content is flushed from the initial partition or if all content stored in the initial partition is considered to be buffered content.

Process 600 proceeds next to block 618, where the initial partition is converted into a viewing buffer. This converted buffer is utilized by the television receiver to temporarily store data, such as content associated with a current channel that the user of the television receiver is watching (e.g., at block 418 in FIG. 4).

In various embodiments, the index file and other metadata stored by the television receiver and the storage device is updated with various parameters of the converted buffer. In at least one embodiment, a flag is altered indicating that the initial partition has changed from being the only available storage capacity for storing data to be a buffer for temporarily storing content.

In at least one embodiment, the initial partition may be modified to include more or less storage capacity depending on user preferences or television receiver requirements indicating how much storage capacity the storage device should maintain to buffer content. For example, in some embodiments, if the initial partition is too large or too small (i.e., more or less than a threshold storage amount) for the desired buffer size, the television receiver repartitions the initial partition to be a size that is appropriate for the desired buffer size.

After block 618, process 600 terminates or otherwise returns to a calling process to perform other actions.

Figure 7:
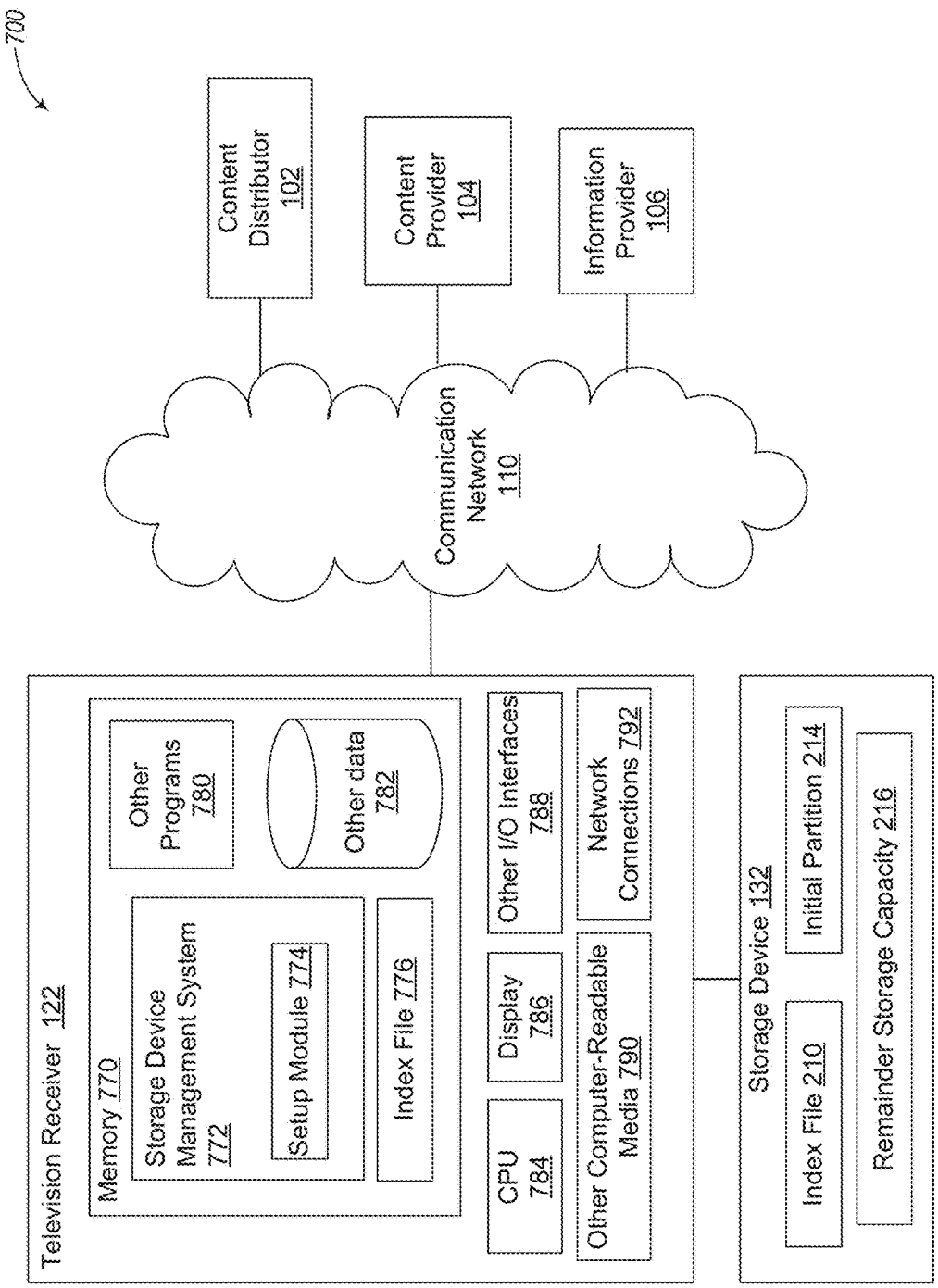
FIG. 7 shows a system diagram that describes one implementation of computing systems for implementing embodiments described herein.

FIG. 7 shows a system diagram that describes one implementation of computing systems for implementing embodiments described herein. System 700 includes television receiver 122, content distributor 102, content provider 104, and information provider 106. System 700 also includes television storage device 132 communicatively connected to television receiver 122.

Television receiver 122 receives content from content distributor 102 and decodes the content for presentation to a user. Upon connection of the television storage device 132 to the television receiver 122, the television receiver 122 creates an initial partition 214 on the television storage device 132 to be used by the television receiver 122 for recording and buffering, but the television receiver 122 does not fully partition the entire storage capacity of the storage device 132, resulting in remainder storage capacity 216, as described herein. The television receiver generates and stores index file 776 in memory 770 and also stores the index file 210 on the television storage device 132. The index file 776 and the index file 210 include the index file for the television storage device 132 as well as other associated metadata.

One or more general-purpose or special-purpose computing systems may be used to implement television receiver 122. Accordingly, various embodiments described herein may be implemented in software, hardware, firmware, or in some combination thereof.

Television receiver 122 includes memory 770, one or more central processing units (CPUs) 784, display interface 786, other I/O interfaces 788, other computer-readable media 790, and network connections 792.

Memory 770 includes one or more various types of non-volatile and/or volatile storage technologies. Examples of memory 770 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 770 may be utilized to store information, including computer-readable instructions that are utilized by CPU 784 to perform actions, including embodiments described herein.

Memory 770 may have stored thereon storage device management system 772, which includes setup module 774. The setup module 774 employs embodiments described herein to provision an initial partition on the television storage device 132 without fully partitioning the television storage device 132. The setup module 774 also performs a full partition and setup of the television storage device 132 at a later time when the television receiver 122 is in an idle state or not being utilized by a user.

Memory 770 also stores other programs 780 and other data 782. For example, other data 782 may include recording schedules, user preferences, user program guides, or other information.

Display interface 786 is configured to provide content to a display device, such as display device 124. Network connections 792 are configured to communicate with other computing devices, such as content distributor 102 via communication network 110. Other I/O interfaces 788 may include a keyboard, audio interfaces, other video interfaces, communication interfaces for transferring data to and from the television storage device 132, or other input or output interfaces. Other computer-readable media 790 may include other types of stationary or removable computer-readable media, such as removable flash drives, external hard drives, or the like.

Content distributor 102, content provider 104, information provider 106, and television receiver 122 may communicate via communication network 110. The content distributor 102, content provider 104, and information provider 106 include processors, memory, network connections, and other computing components that enable the server computer devices, but are not illustrated here for convenience.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a television receiver, comprising:
   determining that an external storage device is connected to the television receiver, the external storage device having a maximum storage capacity;
   partitioning only a first portion of the maximum storage capacity of the external storage device to provide accessibility for storing audiovisual content during a first time period, the partitioned first portion being a size that is less than the maximum storage capacity of the external storage device;
   completing the partitioning of only the first portion within a first time interval;
   maintaining a second portion of the maximum storage capacity of the external storage device to be inaccessible for storing audiovisual content during the first time period;
   receiving first audiovisual content to store on the external storage device during the first time period;
   storing the first audiovisual content in the partitioned first portion of the external storage device;
   in response to a conclusion of the first time period, partitioning the second portion of the maximum storage capacity of the external storage device to provide increased accessibility for now storing audiovisual content during a second time period after the first time period;

completing the partitioning of the second portion within a second time interval, the second time interval being longer than the first time interval;
receiving second audiovisual content to store on the external storage device during the second time period; and
storing the second audiovisual content in the partitioned second portion of the external storage device.

2. The method of claim 1, wherein the partitioned first portion is sized to store approximately one hour of received audiovisual content.

3. The method of claim 1, further comprising:
detecting an idle condition of the television receiver; and
in response to detection of the idle condition of the television receiver, activating the conclusion of the first time period to initiate the partitioning of the second portion of the external storage device.

4. The method of claim 1, further comprising:
in response to partitioning the second portion of the external storage device, converting the partitioned first portion of the external storage device into a buffer;
receiving, during the second time period, third audiovisual content to be temporarily stored on the external storage device; and
storing the third audiovisual content in the buffer for a temporary duration;
receiving, during the second time period, fourth audiovisual content to be stored on the external storage device for a long-term duration; and
storing the fourth audiovisual content in the partitioned second portion of the external storage device.

5. The method of claim 1, further comprising:
in response to partitioning the second portion of the external storage device, maintaining the partitioned first portion of the external storage device for buffering audiovisual content during the second time period;
receiving, during the second time period, third audiovisual content to be buffered on the external storage device;
buffering the third audiovisual content in the partitioned first portion of the external storage device;
receiving, during the second time period, fourth audiovisual content to be stored on the external storage device for a long-term duration; and
storing the fourth audiovisual content in the partitioned second portion of the external storage device.

6. The method of claim 1, further comprising:
receiving third audiovisual content to store on the external storage device during the first time period;
detecting that the partitioned first portion of the external storage device is full; and
in response to the detection that the partitioned first portion of the external storage device is full, removing oldest stored first audiovisual content from the partitioned first portion of the external storage device and storing the third additional visual content in the partitioned first portion of the external storage device.

7. The method of claim 1, further comprising:
receiving third audiovisual content to store on the external storage device during the first time period;
detecting that the partitioned first portion of the external storage device is full;
partitioning a first subset portion of the second portion of the maximum storage capacity of the external storage device to provide additional accessibility for storing audiovisual content during the first time period; and
maintaining a second subset portion of the second portion of the maximum storage capacity of the external storage device to continue to be inaccessible for storing audiovisual content during the first time period.

8. A television receiver, comprising:
a communication interface to store data on and read data from an external storage device having a maximum storage capacity;
an internal memory that stores instructions;
a processor that executes the instructions to:
determine that the external storage device is connected to the communication interface;
provision a first partition from the maximum storage capacity of the external storage device to be accessible for storing audiovisual content during a first time period;
during the first time period:
maintain a remainder portion of the maximum storage capacity of the external storage device to be inaccessible for storing audiovisual content;
receive first audiovisual content to store on the external storage device;
store the first audiovisual content in the partitioned first portion of the external storage device;
provision a second partition from the remainder portion of the maximum storage capacity of the external storage device to be accessible for storing audiovisual content during a second time period after the first time period;
maintain the first partition of the external storage device as a buffer during the second time period; and
during the second time period:
receive second audiovisual content for long term storage on the external storage device;
store the second audiovisual content in the second partition of the external storage device;
receive third audiovisual content for temporary storage on the external storage device; and
store the third audiovisual content in the buffer.

9. The television receiver of claim 8, wherein the processor executes the instructions to further:
determine the size of the first partition of the external storage device to store approximately one hour of received audiovisual content.

10. The television receiver of claim 8, wherein the processor executes the instructions to further:
identify a background setup condition;
end the first time period; and
initiate the provisioning of the second partition of the external storage device.

11. The television receiver of claim 8, wherein the processor maintains the first partition of the external storage device as the buffer by executing the instructions to further convert the first partition of the external storage device into the buffer after the first time period and prior to the second time period.

12. The television receiver of claim 8, wherein the processor executes the instructions to further:
during the first time period:
receive fourth audiovisual content to store on the external storage device;
determine that the first partition of the external storage device is full; and
in response to the determination that the first partition of the external storage device is full, remove oldest stored first audiovisual content from the first partition and store the fourth additional visual content in the first partition.

13. The television receiver of claim 8, wherein the processor executes the instructions to further:
during the first time period:
receive fourth audiovisual content to store on the external storage device;
determine that the first partition of the external storage device is at capacity;
provision a third partition from a first subset portion of the remainder portion of the maximum storage capacity of the external storage device to be accessible for storing audiovisual content during the first time period; and
maintain a second subset portion of the remainder portion of the maximum storage capacity of the external storage device to continue to be inaccessible for storing audiovisual content during the first time period.

14. The television receiver of claim 8, wherein the processor executes the instructions to further:
determine a filesystem for the external storage device;
prepare an index file for the external storage device based on the determined filesystem;
store the index file on the external storage device separate from the first partition of the external storage device; and
store the index file on the internal memory.

15. A system, comprising:
a storage device that has a maximum storage capacity for storing audiovisual content;
a television receiver that includes a processor that executes instructions to perform actions, the actions including:
preparing a first portion of the maximum storage capacity of the storage device to be available for storing audiovisual content during a first time interval;
sustaining a different second portion of the maximum storage capacity of the storage device to be unavailable for storing audiovisual content during the first time interval;
receiving first audiovisual content during the first time interval;
storing the first audiovisual content in the first portion of the storage device;
identifying an idle condition of the television receiver as a conclusion of the first time interval;
in response to detection of the idle condition of the television receiver, preparing the second portion of the maximum storage capacity of the storage device to now be available for storing audiovisual content during a second time interval that is after the first time interval;
receiving second audiovisual content during the second time interval; and
storing the second audiovisual content in the second portion of the storage device.

16. The system of claim 15, wherein the television receiver executes the instructions to perform further actions, the further actions comprising:
in response to preparing the second portion of the storage device, converting the first portion of the storage device into a buffer;
receiving third audiovisual content to be temporarily stored on the storage device during the second time interval;
storing the third audiovisual content in the buffer for a temporary duration;
receiving, during the second time interval, fourth audiovisual content to be stored on the storage device for a long-term duration; and
storing the fourth audiovisual content in the second portion of the storage device.

17. The system of claim 15, wherein the television receiver executes the instructions to perform further actions, the further actions comprising:
in response to preparing the second portion of the storage device, maintaining the first portion of the storage device to buffer audiovisual content during the second time interval;
receiving third audiovisual content to be buffered on the storage device during the second time interval; and
buffering the third audiovisual content in the first portion of the storage device;
receiving, during the second time interval, fourth audiovisual content to be stored on the storage device for a long-term duration; and
storing the fourth audiovisual content in the second portion of the storage device.

18. The system of claim 15, wherein the television receiver executes the instructions to perform further actions, the further actions comprising:
receiving third audiovisual content to store on the storage device during the first time interval;
detecting that the first portion of the storage device of the storage device is full;
preparing a first subset portion of the second portion of the maximum storage capacity of the storage device to be available for storing audiovisual content during the first time interval; and
sustaining a second subset portion of the second portion of the maximum storage capacity of the storage device to continue to be unavailable for storing audiovisual content during the first time interval.

* * * * *